United States Patent [19]

Fenster et al.

[11] 4,128,265

[45] Dec. 5, 1978

[54] HYDRANT VALVE CONNECTION

[75] Inventors: Abraham S. Fenster; Fred W. Salloga, both of Chattanooga, Tenn.

[73] Assignee: United States Pipe and Foundry Company, Birmingham, Ala.

[21] Appl. No.: 814,769

[22] Filed: Jul. 11, 1977

[51] Int. Cl.² .................................... F16L 37/14
[52] U.S. Cl. ................................ 285/305; 403/326; 403/355
[58] Field of Search ............... 285/305, 421; 403/326, 403/335, 355, 364, DIG. 7; 137/272

[56] References Cited

U.S. PATENT DOCUMENTS

| 268,686 | 12/1882 | Kaiser | 137/296 X |
|---|---|---|---|
| 1,881,980 | 10/1932 | Thomas | 285/305 |
| 2,021,241 | 11/1935 | Mall | 285/305 X |
| 3,422,630 | 1/1969 | Marier | 403/355 X |
| 3,586,019 | 6/1971 | Thomas et al. | 137/307 X |
| 3,899,196 | 8/1975 | Dashner | 285/422 X |

Primary Examiner—Martin P. Schwadron
Assistant Examiner—Richard Gerard
Attorney, Agent, or Firm—James W. Grace

[57] ABSTRACT

A fire hydrant having an improved means of attaching the lower stand pipe portion to the hydrant valve body. The lower stand pipe is sealed to the valve body by means of a well-known push-on joining method and is prevented from separating therefrom by use of novel keying means. The keys can be removed should it become necessary to separate the lower stand pipe from the hydrant valve body.

3 Claims, 4 Drawing Figures

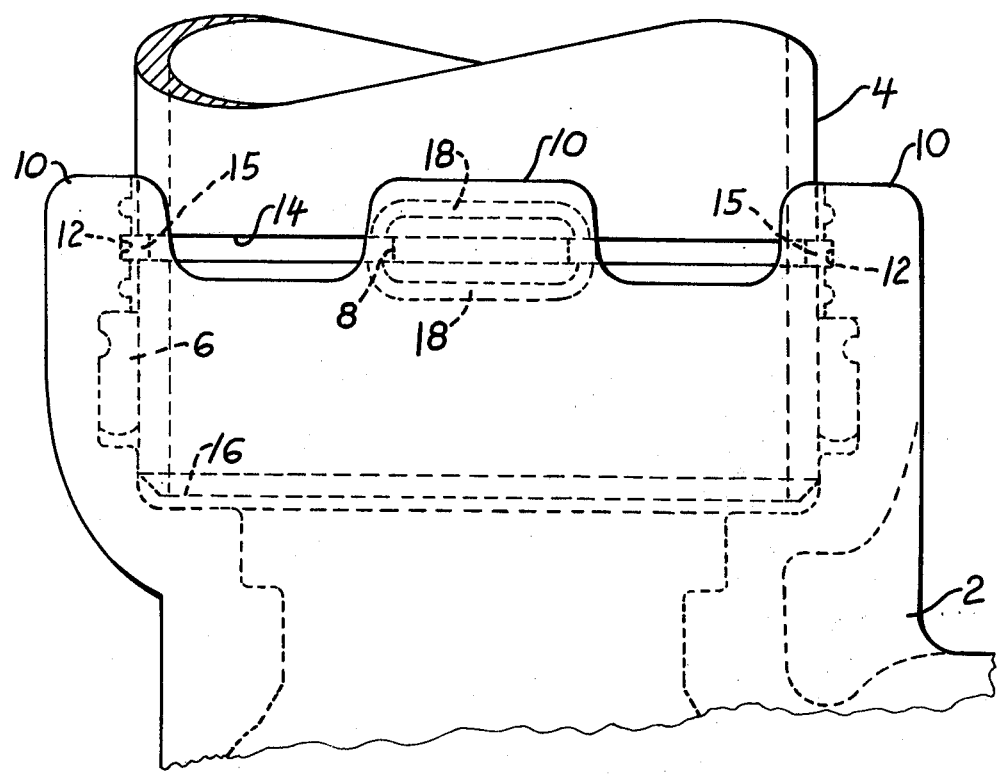
Fig. 3
Fig. 4
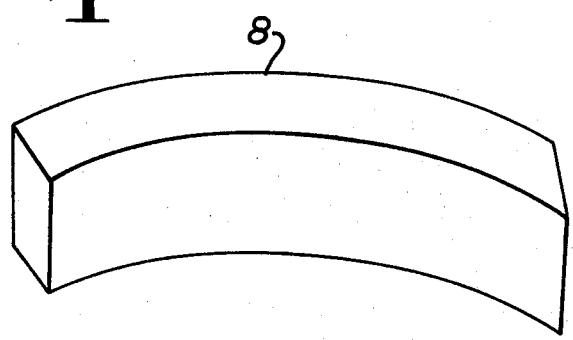

HYDRANT VALVE CONNECTION

BACKGROUND OF THE INVENTION

1. Field of the Invention

This invention relates to an improved fire hydrant and, more specifically, to an improved combination wherein a fire hydrant has the hydrant valve body attached to the lower stand pipe portion by means of a restrained push-on joining method.

2. Description of the Prior Art

Hydrant valves are known to be attached to lower stand pipes by means of matching flanges, i.e., a flange on the hydrant valve body is bolted to a flange on the lower stand pipe with a gasket therebetween. Other methods are known wherein clamping lugs are bolted to a flange on the hydrant valve body and exert a clamping force between the hydrant valve flange and a member protruding from the lower stand pipe. All of these known attachment means make use of one or more bolts requiring holes in the castings and time to assemble. The hydrant valve body is of necessity buried in the earth where bolts are subject to corrosion, thus, when it becomes necessary to remove the lower stand pipe from the hydrant valve body, corroded bolts become a problem.

SUMMARY OF THE INVENTION

The applicants have invented a novel combination of a fire hydrant and means for attaching the hydrant valve body to the lower stand pipe such that no bolts, bolt holes or threaded portions are required. Applicants have provided the upper opening of the hydrant valve body with lugs, each lug having a retainer groove and have also provided a matching retainer groove near the lower extremity of the lower stand pipe. The upper opening of the hydrant valve body is also provided with a well-known push-on gasket groove and gasket for receiving the lower end of the lower stand pipe and sealing the connection between the hydrant valve body and the lower stand pipe.

It is an object of this invention to provide a novel fire hydrant which has a lower stand pipe connected to a hydrant valve body without using bolts or threaded connections of any type.

It is also an object of this invention to provide a novel fire hydrant which has a lower stand pipe connected to a hydrant valve body by means not subject to damage from being buried in the earth.

These and other objects and advantages will become apparent to those skilled in the art from the description of the invention taken in conjunction with the accompanying drawings in which like elements are designated by like numerals and in which:

FIG. 3 is a fragmented elevation of the upper portion of the hydrant valve body and the lower portion of the lower stand pipe.

FIG. 4 is a perspective view of a spring key.

DESCRIPTION OF THE PREFERRED EMBODIMENT

Figure 1:
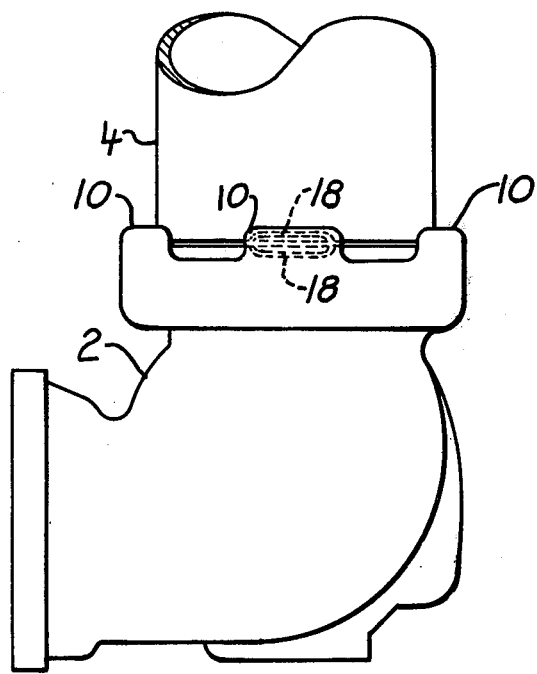
FIG. 1 is a fragmented side elevation of a hydrant valve body with the lower standpipe attached.

Referring to FIG. 1, there is shown a hydrant valve body 2 connected to the hydrant lower stand pipe 4. This connection can be seen in cross section by referring to FIG. 2. The lower stand pipe 4 has been pushed into the upper opening of the hydrant valve body 2 and the connection is sealed by gasket 6. However, this well-known "push on" joining method is not restrained against axial movement. Thus, it is necessary to prevent the lower stand pipe from being pushed upward and out of the hydrant valve body. This is accomplished utilizing novel spring keys 8 as shown in FIG. 4 and more fully described hereinbelow. A plurality of lugs 10 are provided around the periphery of the upper opening of hydrant valve body 2. Each of these lugs contains a retainer groove 12 on its inner periphery. Lower stand pipe 4 also has a continuous retainer groove 14 around its outer periphery and located a predetermined distance from end 16. When the hydrant is assembled gasket 6 is properly placed in hydrant valve body 2 and the lower stand pipe 4 is pushed into the upper opening until retainer groove 14 is aligned with retainer grooves 12. A spring key 8 is driven into each opening 15 formed by the alignment of retainer grooves 12 and 14. These spring keys 8 are smaller in cross section than the cross section of the openings 15. Keys 8 are formed such that they have a shorter radius than does the shortest radius of retainer groove 14. This shorter radius of keys 8 must always assure that the keys 8 will contact the vertical walls of openings 15. Thus, when a key 8 is driven into an opening 15, the key's radius is forced to increase and the key 8 is wedged between the vertical walls of opening 15.

Also, the keys 8 may be so formed that they have a radius perpendicular to the radius of the lower stand pipe 4. Thus, the keys may have two radii, both of which must be increased as the keys are installed. This second radius is quite long since it need only cause the keys 8 to contact both the upper and lower horizontal surfaces of openings 15.

The keys 8 are made of a corrosion resistant resilient material such as stainless steel and are smaller than the opening into which they are inserted, yet must be driven into the opening since their radius (or radii if curvature in two directions is selected) insures an interference with the opening.

Also, the keys 8 are shorter than the grooves retainer 12 in lugs 10 and thus shorter than openings 15. When a key 8 is driven into an opening 15, it is positioned such that the portion of the opening 15 which is unfilled will be at the opposite ends of the key 8 and equally divided.

This means of locking the hydrant valve body 2 to the lower stand pipe 4 not only assures that the keys 8 will not work out during handling or service but also forms a yieldable connection capable of resisting shock.

Figure 2:
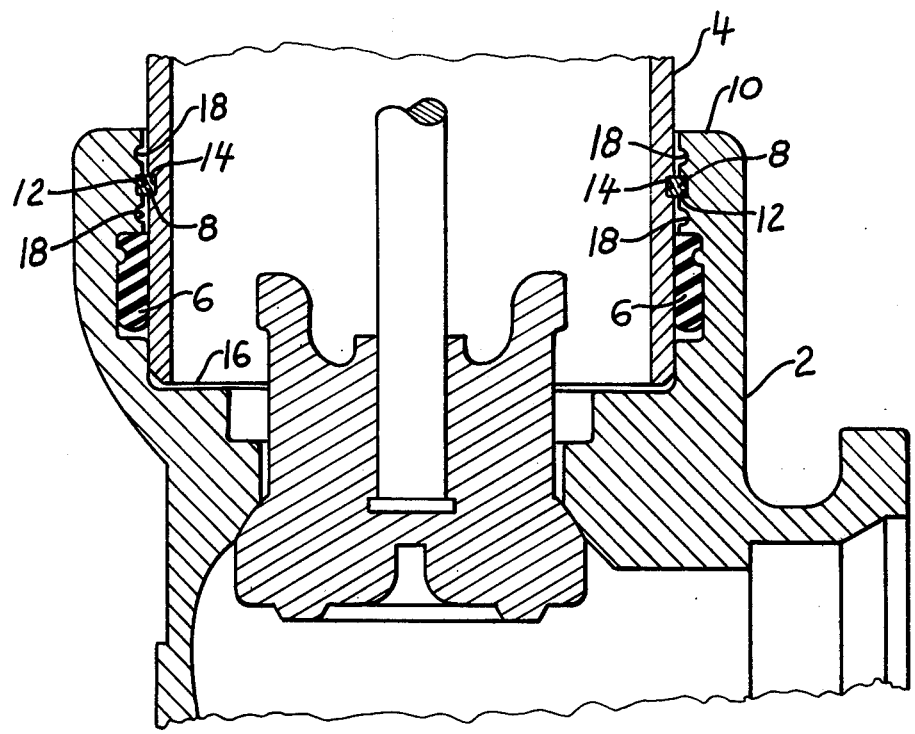
FIG. 2 is a fragmented sectional elevation showing the attachment of the lower stand pipe to the hydrant valve body.

Referring to FIG. 2 and FIG. 3, there may be seen an alternate embodiment of the invention which provides sealant grooves 18 on the inside walls of lugs 10 above and below retainer groove 12. Each of these sealant grooves 18 extend from one end of retainer groove 12 to the other. Thus, when key 8 is located with its ends equidistant from the ends of groove 12, there is formed a continuous groove surrounding key 8. After the keys 8 have been installed, this continuous groove, i.e., the groove formed by sealant grooves 18, and the portions of openings 15 not filled by keys 8 are filled with a pasty non-hardening sealing compound.

While there is herein described the preferred embodiment of the invention, it is to be understood that the invention is not limited thereto but is to encompass other embodiments within the scope of the disclosure.

We claim:

1. The connection of a hydrant valve body to a lower stand pipe having an annular gasket in radial compression between one end of the outer periphery of the lower stand pipe and the inner periphery of an opening in the hydrant valve body wherein the improvement comprises:
   (a) a plurality of lugs around the opening in the hydrant valve body, and
   (b) each lug having a peripherially extending groove on its inner periphery, and
   (c) one end of the lower stand pipe inserted in the opening in the hydrant valve body and having a continuous groove of a certain radius around the outside periphery of said one end; and
   (d) the groove of the lower stand pipe and the grooves of the hydrant valve body lugs forming a series of openings; and
   (e) a resilient key, having a radius less than said certain radius of the continuous groove around the lower stand pipe, driven into each of said openings.

2. The connection of claim 1 wherein said resilient key has an additional radius perpendicular to said radius less than said certain radius of the continuous groove around the lower stand pipe.

3. The connection of claim 1 wherein the peripherially extending groove of (b) has an adjacent sealant groove extending from one of its ends to the other above said peripherially extending groove and has an adjacent sealant groove extending from one of its ends to the other below said peripherially extending groove, and said sealant grooves filled with a sealing compound.

* * * * *